United States Patent
Bonde et al.

(10) Patent No.: US 12,265,754 B2
(45) Date of Patent: *Apr. 1, 2025

(54) AUDIO-BASED NEAR FIELD COMMUNICATION

(71) Applicant: Bose Corporation, Framingham, MA (US)

(72) Inventors: Casper Stork Bonde, Støvring (DK); Nathan A. Blagrove, Wayland, MA (US); Rasmus Abildgren, Skørping (DK)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,092

(22) Filed: Feb. 6, 2023

(65) Prior Publication Data
US 2023/0185520 A1     Jun. 15, 2023

Related U.S. Application Data

(63) Continuation of application No. 17/337,794, filed on Jun. 3, 2021, now Pat. No. 11,573,761.

(51) Int. Cl.
G06F 3/16      (2006.01)
H04R 3/12      (2006.01)

(52) U.S. Cl.
CPC .............. *G06F 3/165* (2013.01); *H04R 3/12* (2013.01); *H04R 2420/07* (2013.01)

(58) Field of Classification Search
CPC ........ G06F 3/165; H04R 3/12; H04R 2420/07
See application file for complete search history.

(56) References Cited

U.S. PATENT DOCUMENTS

| | | | |
|---|---|---|---|
| 2008/0162937 A1* | 7/2008 | Kohlenberg | H04L 63/061 380/278 |
| 2011/0206217 A1* | 8/2011 | Weis | H04M 1/6066 381/74 |

(Continued)

OTHER PUBLICATIONS

Kai Ren, 10 Frequently Asked Questions on LE Isochronous Channels, Mar. 2, 2020, https://www.bluetooth.com/blog/10-frequently-asked-questions-on-le-isochronous-channels/, 3 pages. (Year: 2020).*

*Primary Examiner* — Joseph Saunders, Jr.
(74) *Attorney, Agent, or Firm* — Bond, Schoeneck and King, PLLC

(57) ABSTRACT

The disclosed systems and method provide for an audio playback device to form a Bluetooth connection with an audio source device based on audio generated by an acoustic transducer. The audio is encoded with Bluetooth connectivity data corresponding to the audio source device. The acoustic transducer can be arranged on the audio source device, or it can be arranged on an audio playback device connected to the audio source device via a Bluetooth connection. The audio is received by a microphone of an audio playback device. The audio playback device then extracts the Bluetooth connectivity information from the audio, and forms a Bluetooth connection with the audio source device. If the Bluetooth connection is a Broadcast Audio stream, as defined by the LE Audio standard, multiple audio playback devices can be able to connect audio source device, allowing for a communal listening experience.

16 Claims, 7 Drawing Sheets

(56) References Cited

U.S. PATENT DOCUMENTS

| | | | |
|---|---|---|---|
| 2013/0176984 A1* | 7/2013 | Koezuka | H04W 12/041 |
| | | | 370/329 |
| 2014/0134951 A1* | 5/2014 | Paulson | H04L 27/10 |
| | | | 455/41.2 |
| 2018/0132298 A1* | 5/2018 | Birnam | H04B 11/00 |

* cited by examiner

AUDIO-BASED NEAR FIELD COMMUNICATION

CROSS-REFERENCE TO RELATED APPLICATIONS

This application claims priority to and benefit of U.S. patent application Ser. No. 17/337,794 filed Jun. 3, 2021, the contents of which are herein incorporated by reference in their entirety.

BACKGROUND

Aspects and implementations of the present disclosure are generally directed to audio-based near field communication, particularly in relation to communication via Bluetooth.

Bluetooth connections require the exchange of connectivity information between devices. The connectivity information can include pairing information. Pairing is the process of establishing a secure connection between two Bluetooth-enabled devices. Pairing information includes a key and information to identify one of the devices for future connections. Currently, connectivity information is most often conveyed over the Bluetooth frequency band of 2.4 GHz. In some other cases, connectivity information can be shared over the near field communication (NFC) band of 13.56 MHz when the devices are within 4 cm of each other. However, in certain circumstances, it may be advantageous to exchange the connectivity information via other means.

Further, as Bluetooth-enabled playback devices become more ubiquitous, there may be a desire for communal listening experiences between multiple users. For example, a couple watching a video on a tablet computer on public transportation may wish to communally listen to the audio via their individual earbuds or headsets to avoid disturbing the other riders. In another example, a sports bar showing different sporting events on different television sets may wish to allow its patrons to listen to the audio of the television sets via their individual Bluetooth-enabled playback devices. While it may be possible to exchange connectivity information between these devices via NFC, there are instances where the use of NFC is inconvenient or impractical. Accordingly, there is a need for a system for conveniently sharing Bluetooth connectivity information to enable communal listening experiences.

SUMMARY

The present disclosure relates to systems and methods for audio-based near field communication using an audio playback device, such as an audio headset, a hearing aid, a set of audio eyeglasses, or a set of earbuds to form a Bluetooth connection with an audio source device, such as a smartphone, tablet computer, personal computer, or television set.

For the purposes of this disclosure, and in addition to its plain and ordinary meaning, a "Bluetooth connection" is defined as the relationship between a first device which wirelessly transmits data according to a Bluetooth protocol, and a second device which wirelessly receives the data according to the Bluetooth protocol. Depending on the desired application, the Bluetooth connection can be Bluetooth classic, Low Energy (LE) Audio, or any other variety of Bluetooth connection. The Bluetooth connection can be bidirectional, such as in the case of a Connected Isochronous Stream (CIS). Alternatively, the Bluetooth connection can be unidirectional, such as in the case of a Broadcast Isochronous Stream (BIS). The Bluetooth connection can also include a Bluetooth Broadcast/Receiver channel. In a Bluetooth Broadcast/Receiver channel, the device transmitting Bluetooth data is referred to as a Broadcaster, while the device receiving the Bluetooth data is referred to as a Broadcast Receiver. Depending on the application, the Bluetooth connection can be encrypted or unencrypted.

In the disclosed systems and methods, audio is generated by an acoustic transducer. The audio is encoded with Bluetooth connectivity information corresponding to the audio source device, such as pairing information and security information. The acoustic transducer can be arranged on the audio source device, or it can be arranged on an audio playback device actively connected to the audio source device via a Bluetooth connection. The connected audio playback device can be an audio headset, a smart speaker, a set of audio eyeglasses, or a set of earbuds. The audio is received by a microphone of an audio playback device. The audio playback device then extracts the Bluetooth connectivity information from the audio, and forms a Bluetooth connection with the audio source device. If the Bluetooth connection is a BIS, as defined by the LE Audio standard, then multiple audio playback devices can connect to the audio source device, allowing for a synchronized, communal listening experience.

In some examples, if the Bluetooth connection between the audio source device and the connected audio playback device is a CIS, the connected audio playback device can be configured to set the audio source device into BIS audio mode. The audio playback device and the connected audio playback device will both receive synchronized audio via the BIS audio stream.

In some examples, the audio source device is a tablet computer. The tablet computer is connected to a connected audio device, such as an audio headset, via a Bluetooth connection. A new audio playback device, such as a set of earbuds, can be added to the Bluetooth connection by first triggering the audio headset to transmit probe audio. The probe audio can be triggered by a number of different trigger events, such as a user removing the audio headset from their head. The earbuds receive the probe audio, and transmit response audio back to the audio headset. Upon receiving the response audio, the audio headset transmits a Bluetooth configuration data to place the tablet in BIS mode. The audio headset also generates audio encoded with Bluetooth connectivity information corresponding to the tablet. One or more microphones within the earbuds capture the audio with the Bluetooth connectivity information. The earbuds extract the connectivity information and form a Bluetooth connection with the audio source device. Accordingly, the result is a tablet transmitting an LE Audio BIS, which is received by both the audio headset and the earbuds simultaneously, thus enabling a communal listening experience for the wearers of the audio headset and the earbuds.

In some examples, the audio source device is a television set in a communal setting, such as a sports bar. The television set is connected to a connected audio device, such as a smart speaker, via a Bluetooth connection configured as a BIS. The Bluetooth connection is encrypted with a key. The smart speaker generates audio encoded with Bluetooth connectivity information, which includes the key to decrypt the Bluetooth connection. A user enters the bar wearing an audio playback device, such as a hearing aid. The hearing aid receives the audio and extracts the Bluetooth connectivity information, including the key. This extraction can be accompanied by a notification from the hearing aid, such as a tone or a beep. Upon receiving the notification, the user can enter an input into the hearing aid, such as by tapping the hearing aid, to join the Bluetooth connection and receive a BIS from the television set. The user can then enter additional inputs to adjust the volume of the hearing aid playback audio from the television or the mix of television set BIS audio and environmental audio.

Generally, in one aspect, an audio playback device is provided. The audio playback device includes a microphone. The microphone is configured to receive audio. The audio includes Bluetooth connectivity data. The Bluetooth connectivity data corresponds to an audio source device. According to an example, the Bluetooth connectivity data includes Bluetooth pairing information and/or bonding information. According to another example, the Bluetooth connectivity data includes encryption information. According to a further example, the encryption information comprises a key.

The audio playback device further includes a processor. The processor is configured to extract the Bluetooth connectivity data from the audio. The processor is further configured to form a Bluetooth connection between the audio playback device and the audio source device. The Bluetooth connection is formed based on the Bluetooth connectivity data. According to an example, the Bluetooth connection is a Broadcast Audio connection.

According to an example, the audio playback device includes an audio transducer. The audio transducer is configured to generate playback audio based on a playback signal generated by the processor. According to a further example, the playback signal corresponds to a Bluetooth audio stream. The Bluetooth audio stream is transmitted via the Bluetooth connection. In another example, the playback signal corresponds to a blended signal. The blended signal is based on the Bluetooth audio stream transmitted via the Bluetooth connection and environmental audio captured by the microphone.

Generally, in another aspect, a system for forming a Bluetooth connection is provided. The system includes an audio source device. According to an example, the audio source device can be a smartphone, tablet computer, personal computer, or television set. According to an example, the audio source device is configured to generate the audio.

The system further includes an audio playback device. According to an example, the audio playback device is an audio headset, a hearing aid, a set of audio eyeglasses, or a set of earbuds.

The audio playback device includes a microphone. The microphone is configured to receive audio. The audio includes Bluetooth connectivity data. The Bluetooth connectivity data corresponds to an audio source device.

The audio playback device further includes a processor. The processor is configured to extract the Bluetooth connectivity data from the audio. The processor is further configured to form a Bluetooth connection between the audio playback device and the audio source device. The Bluetooth connection is formed based on the Bluetooth connectivity data.

According to an example, the system further includes a connected audio playback device. The connected audio playback device is configured to generate the audio. The connected audio playback device can be an audio headset, a smart speaker, a set of audio eyeglasses, or a set of earbuds.

According to an example, the connected playback device is further configured to generate probe audio. The connected playback device is further configured to receive response audio from the audio playback device. The response audio corresponds to the probe audio. The connected playback device is further configured to transmit, upon receiving the response audio, a Bluetooth configuration data. The Bluetooth configuration data is configured to set the audio source device into Broadcast Audio mode.

According to an example, the connected audio playback device generates the probe audio upon a trigger event. The trigger event can include a motion sequence of the connected audio playback device, an actuation of a button of the connected audio playback device, and/or a voice command.

Generally, in another aspect, a method for forming a Bluetooth connection is provided. The method includes receiving, via a microphone of an audio playback device, audio comprising Bluetooth connectivity data corresponding to an audio source device. The method further includes extracting, via a processor of the audio playback device, the Bluetooth connectivity data from the audio. The method further includes forming, via the processor of the audio playback device, a Bluetooth connection between the audio playback device and the audio source device.

According to an example, the method further includes generating, via the audio source device, audio. In another example, the method further includes generating, via a connected audio playback device, the audio.

According to an example, the method further includes generating, via a connected audio playback device, probe audio. The method further includes receiving, via the audio playback device, the probe audio. The method further includes generating, via the audio playback device, response audio corresponding to the probe audio. The method further includes receiving, via the connected audio playback device, the response audio. The method further includes transmitting, via the connected audio playback device, Bluetooth configuration data upon receiving the response audio. The method further includes receiving, via the audio source device, the Bluetooth configuration data. The method further includes setting the audio source device into Broadcast Audio mode upon receiving the Bluetooth configuration data.

In various implementations, a processor or controller can be associated with one or more storage media (generically referred to herein as "memory," e.g., volatile and non-volatile computer memory such as ROM, RAM, PROM, EPROM, and EEPROM, floppy disks, compact disks, optical disks, magnetic tape, Flash, OTP-ROM, SSD, HDD, etc.). In some implementations, the storage media can be encoded with one or more programs that, when executed on one or more processors and/or controllers, perform at least some of the functions discussed herein. Various storage media can be fixed within a processor or controller or can be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also can appear in any disclosure incorporated by reference should be accorded a meaning most consistent with the particular concepts disclosed herein.

Other features and advantages will be apparent from the description and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various examples.

DETAILED DESCRIPTION

The present disclosure relates to systems and methods for audio-based near field communication using an audio playback device, such as an audio headset, a hearing aid, a set of audio eyeglasses, or a set of earbuds to form a Bluetooth connection with an audio source device, such as a smartphone, tablet computer, personal computer, or television set. In the disclosed systems and methods, audio is generated by an acoustic transducer. The audio is encoded with Bluetooth connectivity information corresponding to the audio source device, such as pairing information and security information. The acoustic transducer can be arranged on the audio source device, or it can be arranged on an audio playback device actively connected to the audio source device via a Bluetooth connection. The connected audio playback device can be an audio headset, a smart speaker, a set of audio eyeglasses, or a set of earbuds. The audio is captured by a microphone of an audio playback device. The audio playback device then extracts the Bluetooth connectivity information from the audio, and forms a Bluetooth connection with the audio source device based on the Bluetooth connectivity information. If the Bluetooth connection is a Broadcast Audio stream, as defined by the LE Audio standard, then multiple audio playback devices can connect audio source device, allowing for a synchronized, communal listening experience.

Figure 1:
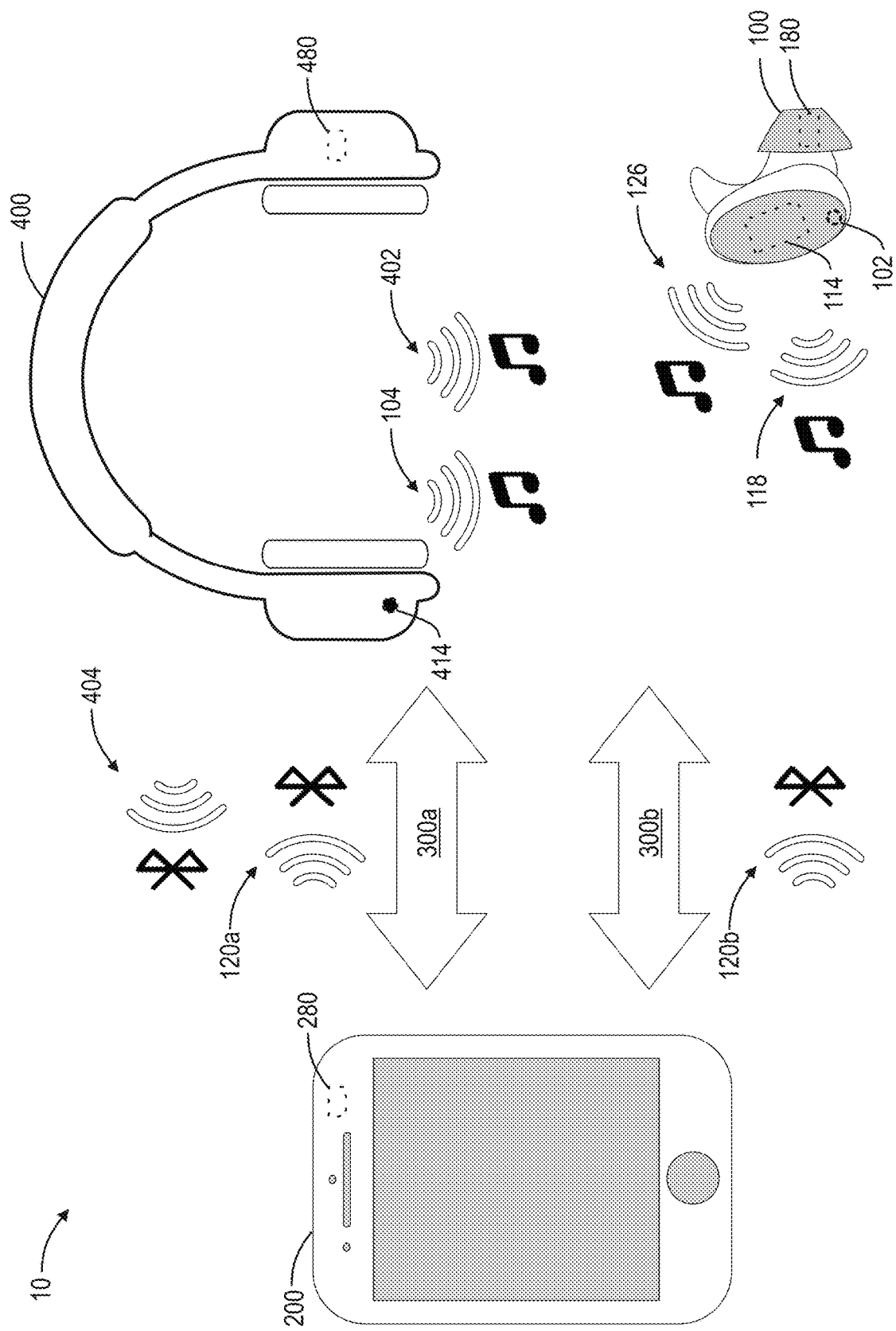
FIG. 1 is a first audio and data transmission diagram of an audio playback device, an audio source device, and a connected audio playback device, according to an example.

FIG. 1 shows an example of the aforementioned system 10 in which an audio playback device 100, in the form of an earbud (by way of example), forms a Bluetooth connection 300b with an audio source device 200, in the form of a tablet computer (by way of example), based on audio 104 generated by a connected audio playback device 400, in the form of an audio headset (by way of example). The connected audio playback device 400 has been previously "connected" to the audio source device 200 via Bluetooth connection 300a.

For the purposes of this disclosure, and in addition to its plain and ordinary meaning, a "Bluetooth connection" is defined as the relationship between a first device which wirelessly transmits data according to a Bluetooth protocol, and a second device which wirelessly receives the data according to the Bluetooth protocol. Depending on the desired application, the Bluetooth connection can be Bluetooth classic, Low Energy (LE) Audio, or any other variety of Bluetooth connection. The Bluetooth connection can be bidirectional, such as in the case of a Connected Isochronous Stream (CIS). Alternatively, the Bluetooth connection can be unidirectional, such as in the case of Broadcast Isochronous Stream (BIS). Depending on the application, the Bluetooth connection can be encrypted or unencrypted.

Figure 2:
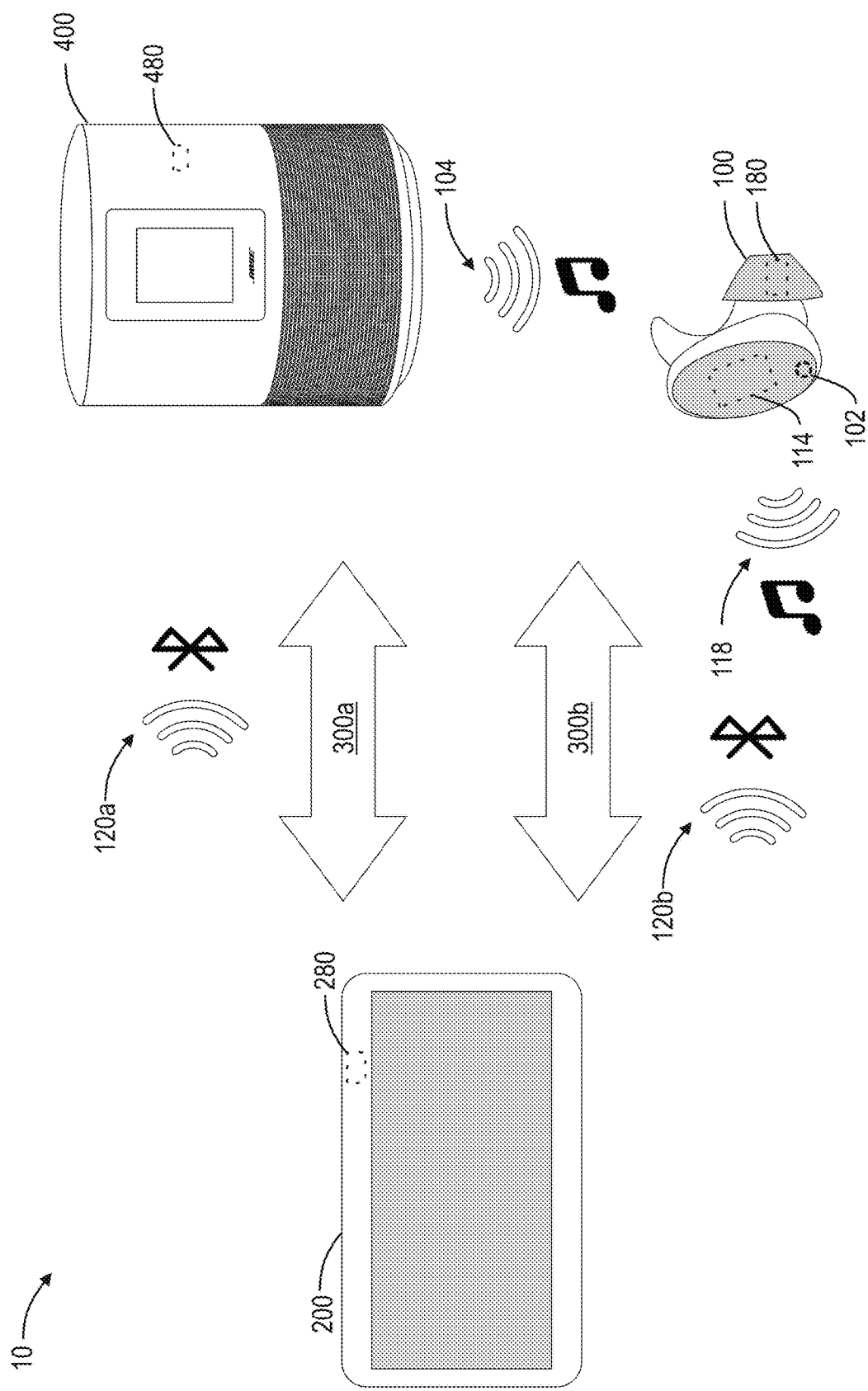
FIG. 2 is a second audio and data transmission diagram of an audio playback device, an audio source device, and a connected audio playback device, according to an example.

FIG. 2 shows an example of the aforementioned system 10 in which an audio playback device 100, in the form of an earbud (by way of example), forms a Bluetooth connection 300b with an audio source device 200, in the form of a television set (by way of example), based on audio 104 generated by a connected audio playback device 400, in the form of a smart speaker (by way of example). The connected audio playback device 400 has been previously "connected" to the audio source device 200 via Bluetooth connection 300a.

Figure 3:
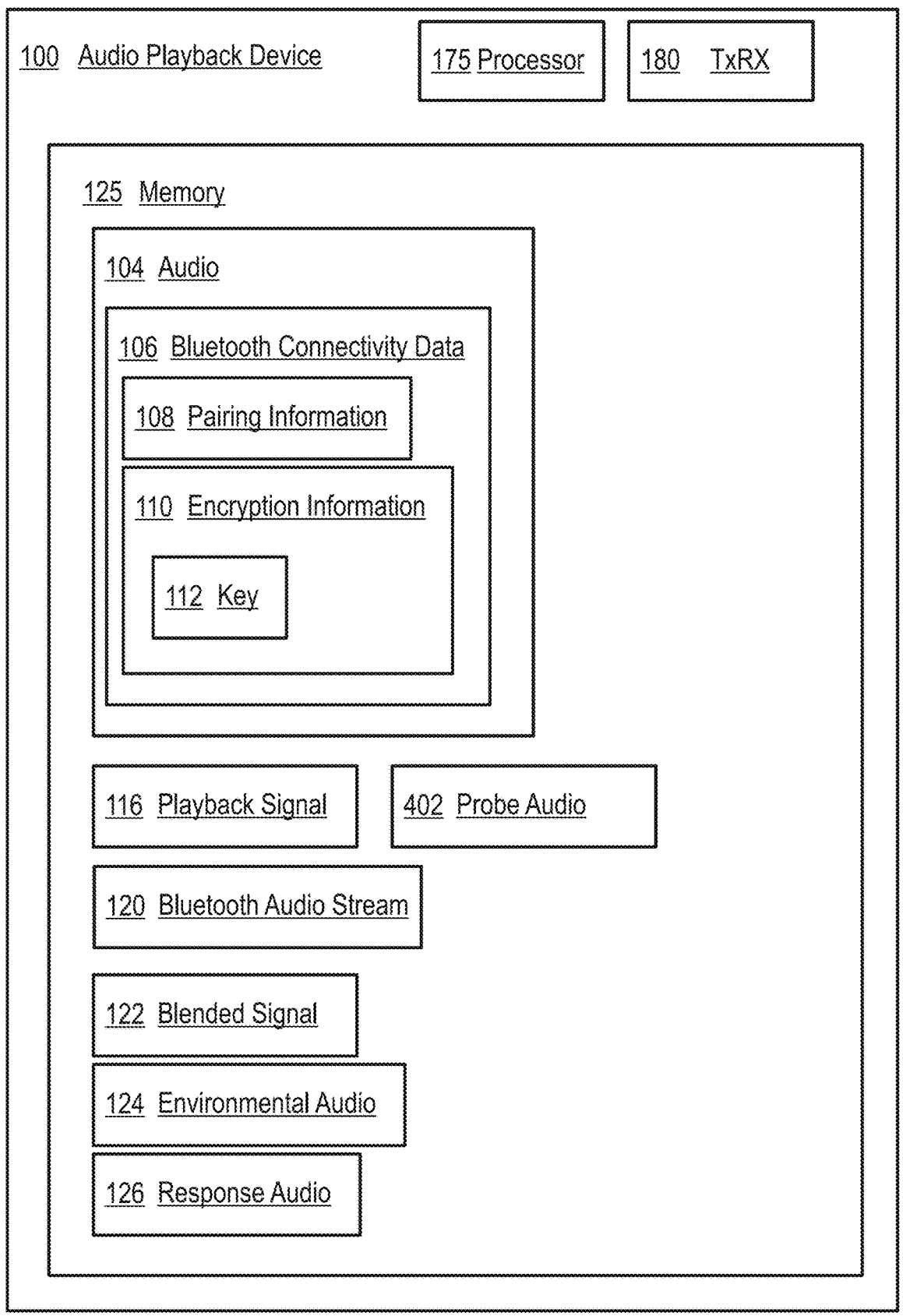
FIG. 3 is a schematic diagram of an audio playback device, according to an example.
Figure 4:
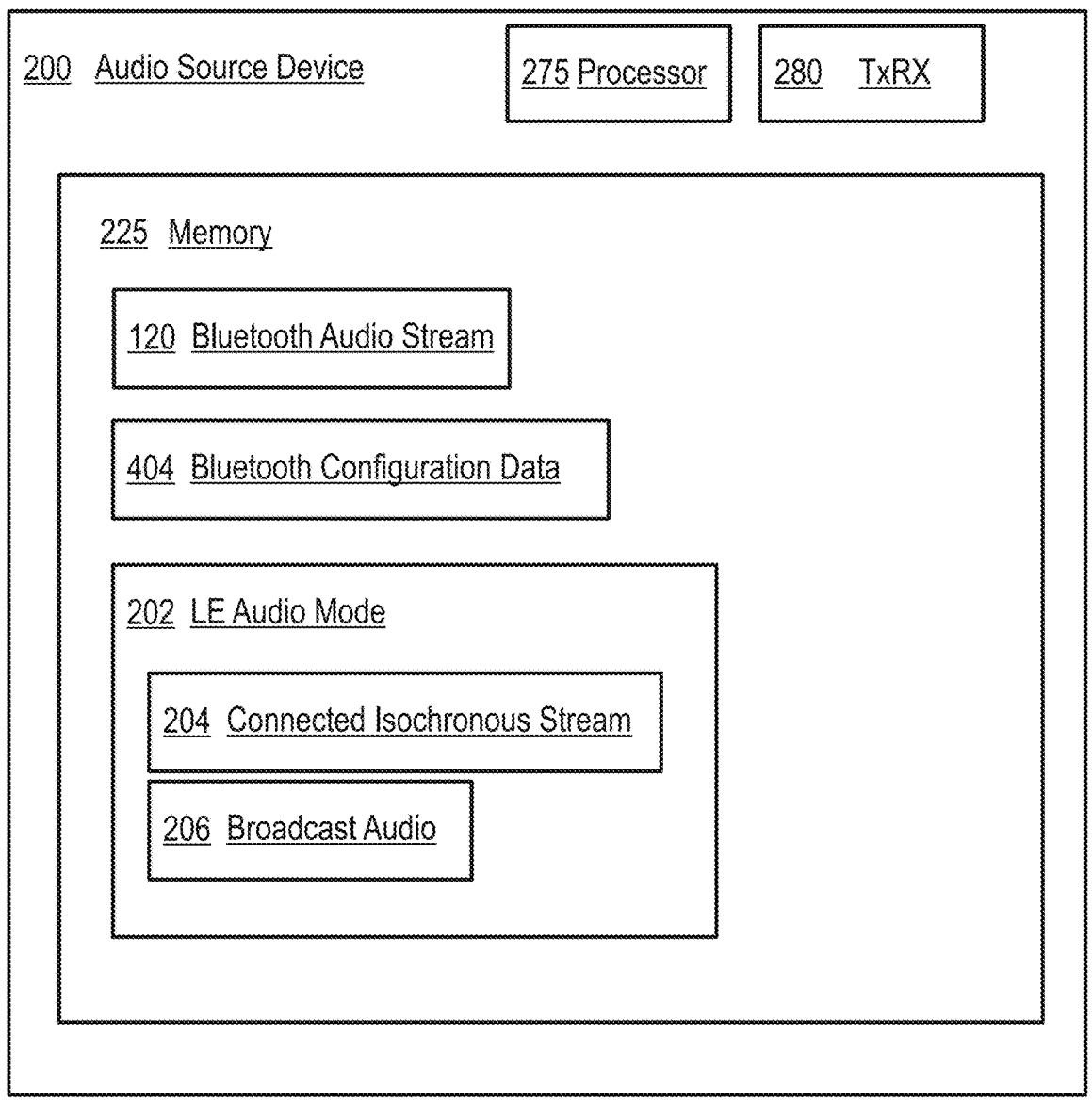
FIG. 4 is a schematic diagram of an audio source device, according to an example.
Figure 5:
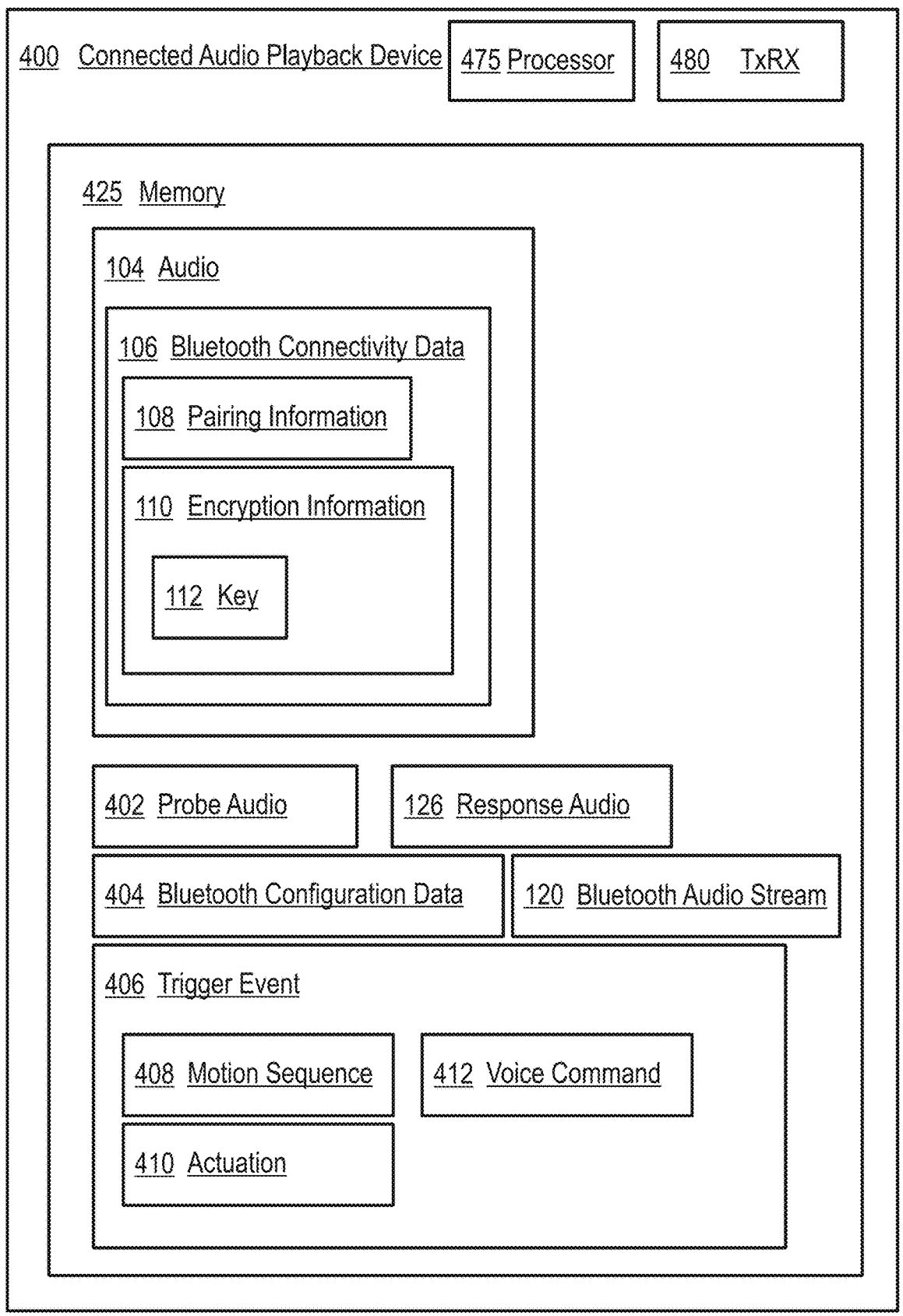
FIG. 5 is a schematic diagram of a connected audio playback device, according to an example.

FIGS. 3 through 5 illustrate various exemplary components of audio playback device 100, audio source device 200, and audio playback device 400, respectively. FIG. 3 shows an audio playback device 100 including a memory 125, a processor 175, and transceiver 180. FIG. 4 shows an audio source device 200 including a memory 225, a processor 275, and transceiver 280. FIG. 5 shows a connected audio playback device 400 including a memory 425, a processor 475, and transceiver 480. The aforementioned transceivers 180, 280, 480 can be Bluetooth transceivers configured to transmit and receive in the Bluetooth frequency band of 2.4000 to 2.4835 GHz to form Bluetooth connections 300a, 300b. The transceivers 180, 280, 480 can also be configured to transmit and receive data via other technologies, such as Wi-Fi. Wi-Fi enabled transceivers can be configured to operate on the 2.4 GHz and/or 5 GHz frequency bands.

With reference to the example shown in FIG. 1, a first user watches a video on the tablet computer 200. The first user is also listening to the accompanying audio track for the video on their audio headset 400 via Bluetooth audio stream 120a transmitted over Bluetooth connection 300a. In a preferred example, the audio source device is LE Audio-enabled and operates in an LE Audio mode 202 of CIS 204. The CIS mode 204 enables a point-to-point stream between the audio source device 200 and the connected audio playback device 400.

The first user wishes for a second user to also listen to the video via their audio playback device 100 so that they can enjoy the video in a communal manner. The first user initiates the formation of Bluetooth connection 300b between the audio source device 200 and the audio playback device 100 by performing a trigger event 406 with their connected audio playback device 400. For example, the first user can perform a motion sequence 408, such as removing the connected audio playback device 400 from their head. In another example, the first user can actuate a button 414 on the connected audio playback device 400. In a further example, the first user can speak a voice command 412 received by a microphone of the connected audio playback device 400.

Subsequent to the trigger event 406, the connected audio playback device 400 emits probe audio 402. The probe audio 402 is generated to search for an audio playback device 100 to connect to the audio source device 200. The users can position the audio playback device 100 closely to the connected audio playback device 400 to ensure the probe audio 402 is received by the audio playback device 100. Proper positioning can be particularly important when the connected audio playback device 400 is designed for personal use (such as an audio headset or earbuds), rather than communal listening (such as a loudspeaker). For example, if the connected audio playback device 400 is an audio headset, the audio playback device 100 may need to be placed within one of the earcups of the headset to capture the probe audio 402.

Upon receiving the probe audio 402, the audio playback device 100 generates response audio 126. The response audio 126 is an acknowledgment of the presence of an audio playback device 100 wishing to form Bluetooth connection 300b with the audio source device 200.

Upon receiving the response audio 126, the connected audio playback device 100 transmits Bluetooth configuration data 404 to the audio source device 200 via Bluetooth connection 300a. The Bluetooth configuration data 404 programs the audio source device 200 to switch LE Audio mode 202 from CIS mode 204 to Broadcast Audio 206. By switching to Broadcast Audio 206, multiple devices can connect to the audio source device 200 and listen to the video in a simultaneous, communal manner.

Next, the connected audio playback device 400 generates audio 104. The audio 104 includes Bluetooth connectivity data 106 to facilitate the formation a Bluetooth connection 300b between the audio playback device 400 and the audio source device 200. The Bluetooth connectivity data 106 can include pairing information 108 corresponding to the audio source device 200, such as the media access control (MAC) address of the audio source device 200. The Bluetooth connectivity data 106 can also include bonding information. Bonding stores the keys created during pairing for use in subsequent connections to form a trusted device pair. Further, the Bluetooth connectivity data 106 can include encryption information 110, such as a shared secret key 112 or certificate. In some examples, a Broadcast Audio stream requires a key to join the stream. The connected audio playback device 400 plays the audio 104 via an acoustic transducer such that it may be received and/or recorded by the audio playback device 100.

Upon receiving the audio 104 including the Bluetooth connectivity data 106, the audio playback device 100 forms a Bluetooth connection 300b with the audio source device 200. The audio playback device 100 can further generate playback audio 118 based on a playback signal 116 generated by its processor 175. In some examples, the playback signal 116 corresponds to Bluetooth audio stream 120b transmitted by the audio source device 200. In other examples, the playback signal 116 can be a blended signal 122 corresponding to an audio mix of the Bluetooth audio stream 120b and environmental audio 124 captured by the microphone 102 or other audio sensors of the audio playback device 100. The blended signal 122 can be particularly useful when the audio playback device 100 is a hearing aid. The audio playback device 100 can further include an input mechanism (such as a button or a dial) to control the mix of the blended signal 122.

In other examples, the audio playback device 100 can be a hearing aid, an audio headset, audio eyeglasses, or any other Bluetooth-enabled device with a microphone 102 capable of capturing audio 104. As will be appreciated by the aforementioned example, the audio playback device 100 must be placed close enough to the connected audio playback device 400 to capture the audio 104.

In an alternate example, the audio 104 including the Bluetooth connectivity data is generated by an acoustic transducer of the audio source device 200 itself. The audio playback device 100 captures the audio 104 with microphone 102. The processor 175 of the audio playback device 100 extracts the Bluetooth connectivity data 106 from the audio 104. The processor 175 then uses the Bluetooth connectivity data 106 to form a Bluetooth connection 300 with the audio source device 200.

In some examples, the audio playback device 100 (such as an earbud) and/or the connected audio playback device 400 (such as a headset) may offload one or more audio processing aspects to the audio source device 200 (such as a smartphone). Audio data can be offloaded to the audio source device 200 via one or more wireless connections, such as a Bluetooth connection. The audio source device 200 can then process the offloaded audio data as required. The processed audio data can be transmitted back to the audio playback device 100 and/or the connected audio playback device 400 for playback and/or further processing. This offloading may be performed to conserve limited computing resources (such as processing and memory) of the audio playback device 100 and/or the connected audio playback device 400.

While the example of FIG. 1 depicts the audio source device 200 as a smartphone, in further examples the audio source device 200 can be any device capable of communicating with the audio playback device 100 and the connected audio playback device 400 via the Bluetooth connections 300a, 300b. For example, the audio source device 200 could be a tablet computer, personal computer, television set, or similar device with audio playback capabilities via an acoustic transducer. In further examples, the audio source device 200 can be a Bluetooth hub which is simply configured to transmit audio data via Bluetooth audio streams 120a, 120b to other devices for playback, rather than playing the audio itself via an acoustic transducer. The Bluetooth hub can receive the audio data from an external source via a wired or wireless connection.

With reference to the example shown in FIG. 2, a user enters a communal setting in which the audio source device 200 is mounted, such as a sports bar. The communal setting can include several audio source devices 200, in the form of several television sets showing different content. The patrons of the sports bar hear to audio generated by the audio source device 200 via connected audio playback device 400, as the audio source device 200 and the connected audio playback device 400 are connected by Bluetooth connection 300a. Further, the operator of the sports bar has programmed the LE Audio mode 202 of the audio source device 200 to Broadcast Audio 206 to allow additional audio playback devices 100, such as wearable, LE Audio-enabled devices worn by patrons (earbuds, hearing aids, etc.) to form a Bluetooth connection 300b with the audio source device 200.

The connected audio playback device 400 generates audio 104. As described in the previous example, the audio 104 includes Bluetooth connectivity data 106, such as Bluetooth pairing information 108 and encryption information 110, corresponding to the audio source device 200. In a preferred example, the Bluetooth connectivity data 106 is coupled and/or modulated to the Bluetooth Audio Stream 120a from the audio source device 200 such that the Bluetooth connectivity data 106 is imperceptible to, or hidden from, a listener. In one example, the Bluetooth connectivity data 106 could be coupled to the audio 104 as a low frequency beat below the human hearing frequency limit of 20 Hz. In another example, the Bluetooth connectivity data 106 could be ultrasonic, high frequency data above the human hearing frequency limit of 20 kHz. In a further example, the connected audio playback device 400 can use wide band encoding to spread the Bluetooth connectivity data 106 along the frequency band of the audio 104. By using wide band encoding, the magnitude of the Bluetooth connectivity data 106 can be just above or below the noise floor of the audio 104. Accordingly, the listener of the audio 104 will only hear an audio track corresponding to the audio source device 200 (such as the audio of a television show) without any additional perceptible audio elements corresponding to the Bluetooth connectivity data 106. In this way, the audio 104 both provides an enjoyable listening experience to patrons watching the television set, while also allowing patrons to connect to the television using their wearable devices without relying on other pairing means, such as near field communication (NFC). While many different means of coupling the Bluetooth connectivity data 106 to the audio 104 exist, the Bluetooth connectivity data 106 must be coupled in such a way as to be captured by the microphone 102 of the audio playback device 100. The connected audio playback device 400 plays the audio 104 via an acoustic transducer such that it may be received and/or recorded by the audio playback device 100.

Once the microphone 102 of the audio source device 100 captures the audio 104, processor 175 extracts the Bluetooth connectivity data 106 from the audio 104. The processor 175 then forms a Bluetooth connection 300b between the audio source device 200 and the audio playback device 100 based on the Bluetooth connectivity data 106. In this example, the Bluetooth connection 300b is a Broadcast Audio connection, as the LE Audio mode 202 of the audio source device 200 is Broadcast Audio 206. Thus, each device (including the audio playback device 100 and the connected audio playback device 400) receives synchronized Bluetooth Audio stream 120a, 120b. The extraction of the Bluetooth connectivity data 106 and/or the formation of the Bluetooth connection 300b can be initiated by performing a trigger event with the audio playback device 100. For example, the user could actuate a button on the audio playback device 400. In another example, the user could speak a voice command received by the microphone 102 of the audio playback device 100.

The audio playback device 100 can then generate a playback signal 116 based on the Bluetooth audio stream 120b. An acoustic transducer 114 of the audio playback device 100 then generates playback audio 118 based on the playback signal 116, allowing the wearer of the audio playback device 100 to listen to the audio source device 200. Alternatively, the playback signal 116 can correspond to a blended signal 122. The blended signal 122 corresponds to an audio mix of the Bluetooth audio stream 120 and an environmental audio 124 captured by the microphone 102 or other audio sensors of the audio playback device 102. The blended signal 122 can be particularly useful when the audio playback device 100 is a hearing aid. The audio playback device 100 can further include a input mechanism (such as a button or a dial) to control the mix of the blended signal 122.

The example of FIG. 2 could also be implemented in an event setting, such as a concert, theatrical production, motion picture screening, lecture, seminar, etc. In an event setting, the audio source device 100 can be a mixing board or amplifier providing the audio 104, including Bluetooth connectivity data 106, to one or more professional quality loudspeakers configured as a line array. Alternatively, the audio source device 100 can be one or more Bluetooth-enabled loudspeakers of the line array.

The example of FIG. 2 can also be implemented in an automotive setting, such as an automobile including a Bluetooth enabled entertainment system. The audio source device 100 can be an automotive audio system providing the audio 104, including Bluetooth connectivity data 106, to one or more speakers.

While the examples of FIGS. 1 and 2 describe coupling Bluetooth connectivity data 106 to audio 104 to facilitate the formation of Bluetooth connections, in further examples other types of connectivity data can be coupled to the audio 104 to facilitate other types of connections. For example, the connectivity data coupled to audio 104 could facilitate the formation of other types of wireless connections, such as Wi-Fi, Zigbee, ultra-wide band, and more. The connectivity data could facilitate the formation of a 2.4 GHz wireless connection, a 5 GHz wireless connection, or both a 2.4 GHz wireless connection and a 5 GHz wireless connection. The connectivity data could facilitate the formation of two or more connection types. For example, the connectivity data could facilitate the formation of both a left stereo audio stream and a right stereo audio stream, such as in the case of two stereo paired devices or a set of truly wireless devices (such as truly wireless earbuds).

Figure 6:
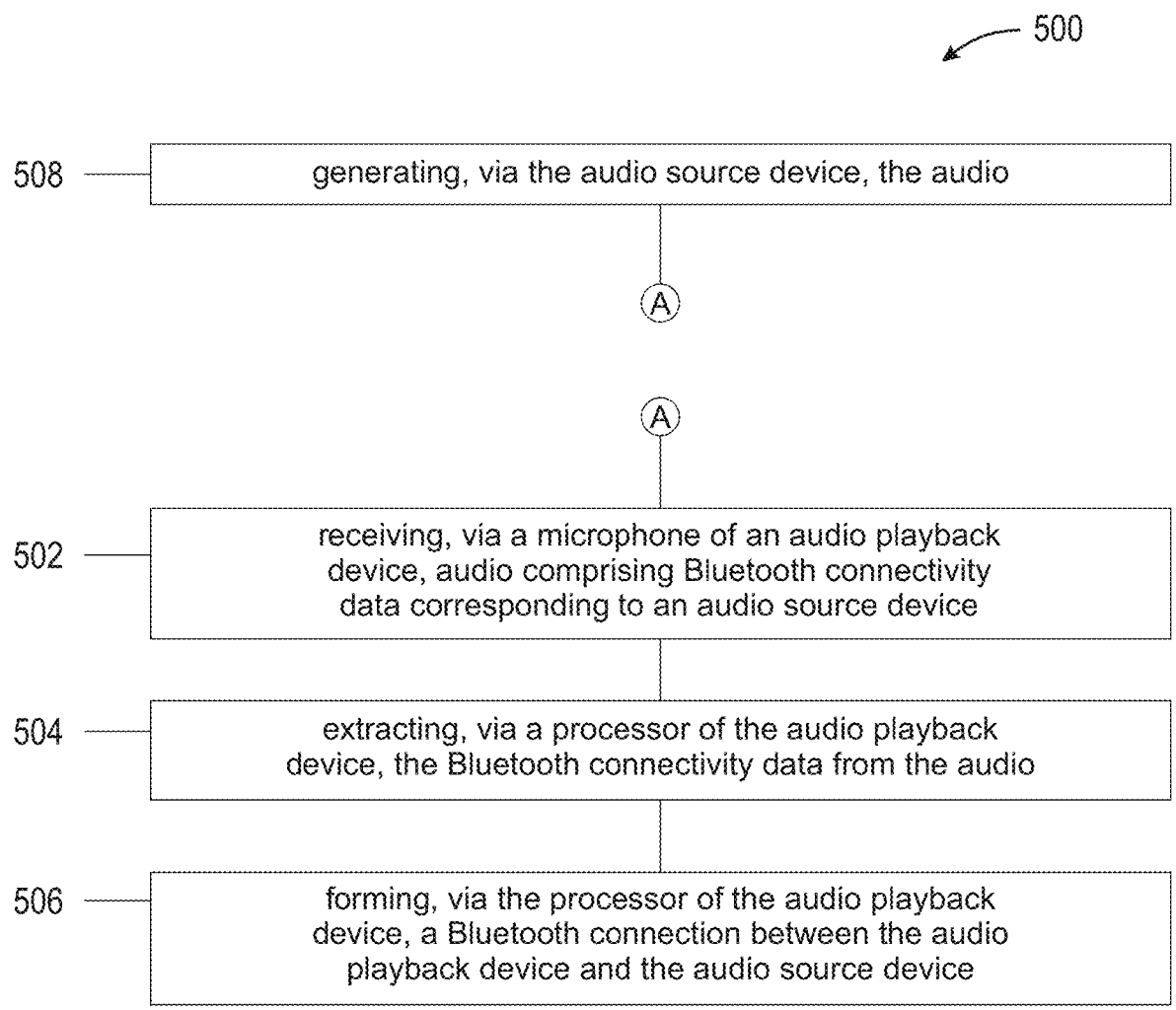
FIG. 6 is a flowchart of a method for forming a Bluetooth connection, according to an example.

Generally, in another aspect, and with reference to FIG. 6, a method 500 for forming a Bluetooth connection is provided. The method 500 includes receiving 502, via a microphone of an audio playback device, audio comprising Bluetooth connectivity data corresponding to an audio source device. The method 500 further includes extracting 504, via a processor of the audio playback device, the Bluetooth connectivity data from the audio. The method 500 further includes forming 506, via the processor of the audio playback device, a Bluetooth connection between the audio playback device and the audio source device. According to an example, the method 500 further includes generating 508, via the audio source device, audio.

Figure 7:
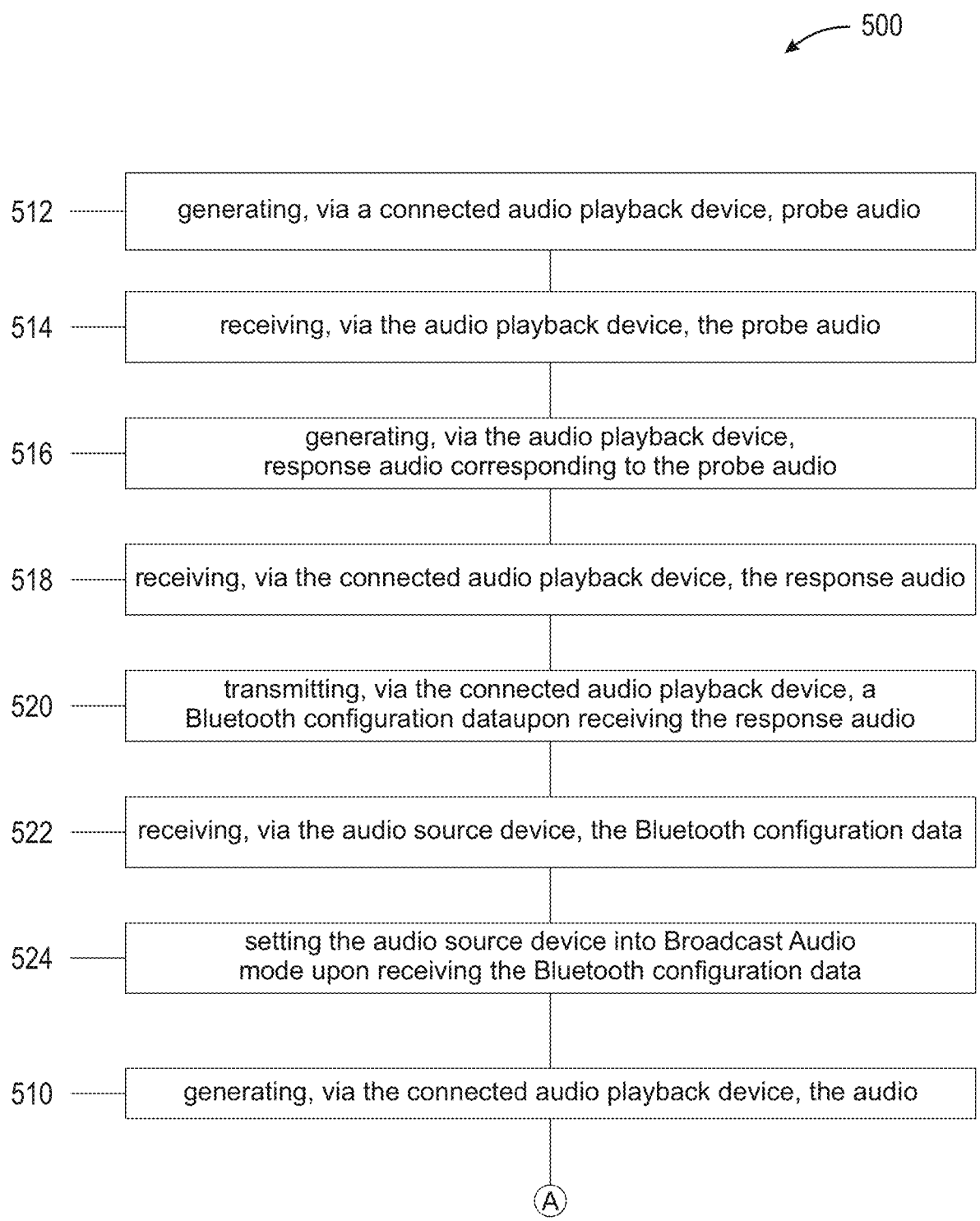
FIG. 7 is a further flowchart of a method for forming a Bluetooth connection, according to an example.

According to an example, and with reference to FIG. 7, the method 500 further includes generating 512, via a connected audio playback device, probe audio. The method 500 further includes receiving 514, via the audio playback device, the probe audio. The method 500 further includes generating 516, via the audio playback device, response audio corresponding to the probe audio. The method 500 further includes receiving 518, via the connected audio playback device, the response audio. The method 500 further includes transmitting 520, via the connected audio playback device, Bluetooth configuration data upon receiving the response audio. The method 500 further includes receiving 522, via the audio source device, the Bluetooth configuration data. The method 500 further includes setting 524 the audio source device into Broadcast Audio mode upon receiving the Bluetooth configuration data. According to a further example, the method 500 further includes generating 510, via a connected audio playback device, the audio.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects can be implemented using hardware, software or a combination thereof. When any aspect is implemented at least in part in software, the software code can be executed on any suitable processor or collection of processors, whether provided in a single device or computer or distributed among multiple devices/computers.

The present disclosure can be implemented as a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions can be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams can represent a module, segment, or portion of instructions, which comprises one or more executable instructions for implementing the specified logical function (s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant can be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples can be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A system comprising a device, wherein the device comprises:
a microphone configured to receive audio, wherein the audio includes data for connecting to a Bluetooth source device that is transmitting an isochronous stream, wherein the audio is generated by an audio headset wirelessly connected to the Bluetooth source device; and
a processor configured to
extract the data from the audio, and
using the data, form a connection with the Bluetooth source device to receive the isochronous stream,
wherein the device is configured to be wearable within an ear of a user and further configured to capture the audio generated by the audio headset when placed within an earcup of the audio headset.

2. The system of claim 1, wherein the isochronous stream is a Broadcast Isochronous Stream (BIS).

3. The system of claim 1, wherein the isochronous stream is a Connected Isochronous Stream (CIS).

4. The system of claim 1, wherein the isochronous stream is encrypted.

5. The system of claim 4, wherein the data includes a key to decrypt the encrypted isochronous stream.

6. The system of claim 1, wherein the data includes at least one of pairing information or bonding information for the Bluetooth source device.

7. The system of claim 1, wherein the data is provided as a low frequency beat below 20 hertz (Hz) or as high frequency data above 20 KHz.

8. The system of claim 1, wherein the device is an earbud or a hearing aid.

9. A method comprising:
receiving audio via a microphone of a device, wherein the audio includes data for connecting to a Bluetooth source device that is transmitting an isochronous stream, wherein the audio is generated by an audio headset wirelessly connected to the Bluetooth source device, and wherein the device is configured to be wearable within an ear of a user, and wherein the device is configured to be placed within an earcup of the audio headset to capture the audio generated by audio headset;
extracting, via the device, the data from the audio; and
using the data, forming, via the device, a connection with the Bluetooth source device to receive the isochronous stream.

10. The method of claim 9, wherein the isochronous stream is a Broadcast Isochronous Stream (BIS).

11. The method of claim 9, wherein the isochronous stream is a Connected Isochronous Stream (CIS).

12. The method of claim 9, wherein the isochronous stream is encrypted.

13. The method of claim 12, wherein the data includes a key to decrypt the encrypted isochronous stream.

14. The method of claim 9, wherein the data includes at least one of pairing information or bonding information for the Bluetooth source device.

15. The method of claim 9, wherein the data is provided as a low frequency beat below 20 hertz (Hz) or as high frequency data above 20 KHz.

16. The method of claim 9, wherein the device is an earbud or a hearing aid.

* * * * *